United States Patent [19]
Murschall et al.

[11] Patent Number: 5,436,041
[45] Date of Patent: * Jul. 25, 1995

[54] TRANSPARENT POLYOLEFIN MULTILAYER FILM HAVING A LOW SEALING TEMPERATURE ON ONE SIDE, PROCESS FOR ITS PRODUCTION AND ITS USE

[75] Inventors: Ursula Murschall, Nierstein; Angela Speith, Wiesbaden; Gunter Schloegl, Kelkheim, all of Germany

[73] Assignee: Hoechst Aktiengesellschaft, Frankfurt am Main, Germany

[*] Notice: The portion of the term of this patent subsequent to Apr. 12, 2011 has been disclaimed.

[21] Appl. No.: 22,150

[22] Filed: Feb. 23, 1993

[30] Foreign Application Priority Data

Feb. 24, 1992 [DE] Germany ............... 43 05 555.5

[51] Int. Cl.$^6$ ............................................. B29D 22/00
[52] U.S. Cl. ............................ 428/34.2; 428/35.9; 428/36.4; 428/215; 428/332; 428/349; 428/354; 428/516; 525/387
[58] Field of Search ............ 428/354, 511, 349, 516, 428/332, 215, 36.4; 525/387

[56] References Cited

U.S. PATENT DOCUMENTS

| | | | |
|---|---|---|---|
| 4,230,767 | 10/1980 | Isaka et al. | 428/513 |
| 4,293,608 | 10/1981 | Isaka et al. | 428/220 |
| 4,343,852 | 8/1982 | Isaka et al. | 428/216 |
| 4,348,457 | 9/1982 | Rosenthal et al. | 428/349 |
| 4,419,411 | 12/1983 | Park | 428/516 |
| 4,502,263 | 3/1985 | Crass et al. | 53/396 |
| 4,552,930 | 11/1985 | Hirota et al. | 525/333.8 |
| 4,720,420 | 1/1988 | Crass et al. | 428/216 |
| 4,764,425 | 8/1988 | Balloni et al. | 428/331 |
| 5,089,319 | 2/1992 | Bothe | 428/216 |
| 5,246,769 | 9/1993 | Murschall et al. | 428/216 |
| 5,302,427 | 4/1994 | Murschall et al. | 428/349 |

FOREIGN PATENT DOCUMENTS

| | | |
|---|---|---|
| 0236945 | 9/1987 | European Pat. Off. |
| 0340579 | 11/1989 | European Pat. Off. |
| 0463517 | 1/1992 | European Pat. Off. |
| 0482501 | 4/1992 | European Pat. Off. |
| 1145199 | 6/1967 | United Kingdom |
| 2201407 | 9/1988 | United Kingdom |

*Primary Examiner*—Edith Buffalow
*Attorney, Agent, or Firm*—Foley & Lardner

[57] ABSTRACT

A transparent, printable, biaxially orientated polyolefin multilayer film which can be sealed on both sides, having a base layer B and different top layers A and C located on both sides thereof in accordance with a layer build-up of ABC is provided. The base layer B contains a peroxidically degraded polypropylene polymer having a degradation factor in the range from about 3 to about 10. Top layer A contains a polymer mixture of two or more of the following co- and/or terpolymers: a copolymer of ethylene and propylene or ethylene and butylene or propylene and butylene or ethylene and another $\alpha$-olefin having 5 to 10 carbon atoms or propylene and another $\alpha$-olefin having 5 to 10 carbon atoms, or a terpolymer of ethylene and propylene and butylene or ethylene and propylene and another $\alpha$-olefin having 5 to 10 carbon atoms. This polymer mixture of top layer A further contains a high-viscosity polydiorganosiloxane and silicon dioxide and, if appropriate, other added additives. Top layer C contains a copolymer of ethylene and propylene or ethylene and butylene or propylene and butylene or ethylene and another $\alpha$-olefin having 5 to 10 carbon atoms or propylene and another $\alpha$-olefin having 5 to 10 carbon atoms, or a terpolymer of ethylene and propylene and butylene or ethylene and propylene and another $\alpha$-olefin having 5 to 10 carbon atoms and, if appropriate, other additives. Top-layer C has a non-cohesive covering of polydialkylsiloxane on its outer surface. The film is useful, for example, as a packaging film and in the production of laminates.

23 Claims, No Drawings

TRANSPARENT POLYOLEFIN MULTILAYER FILM HAVING A LOW SEALING TEMPERATURE ON ONE SIDE, PROCESS FOR ITS PRODUCTION AND ITS USE

BACKGROUND OF THE INVENTION

1. Field of the Invention

The invention relates to a transparent, printable, biaxially orientated polyolefin multilayer film which can be sealed on both sides comprising a base layer B and different top layers A and C located on both sides thereof corresponding to a layer build-up of ABC. Both top layers are sealable, one of the two top layers having a particularly low sealing start temperature.

2. Description of Related Art

Heat-sealable laminates of an orientated polypropylene film which consist of at least one heat-sealable layer comprising ethylene/propylene copolymers of 2 to 6% by weight of ethylene and 98 to 94% by weight of propylene are known from DE-A-16 94 694. Although these films have good heat-sealing properties, they are not clear and scratch-resistant to the desired degree, and moreover display inadequate processing properties on high-speed packaging machines.

Sealable polypropylene films which have a sealing layer of an ethylene homo- or copolymer and are treated with a long-chain aliphatic amine, an incompatible thermoplastic component and a polydialkylsiloxane are known from EP-B-0 027 586. Although these films are an improvement in comparison with those of DE-A-16 94 694, they still have an inadequate running reliability on horizontal shaping-fill-closing machines.

A packaging material which comprises a base layer of a polypropylene polymer and a top layer comprising a mixture of a propylene/ethylene copolymer and a $C_4$–$C_{10}$-α-olefin/propylene copolymer is known from DE-A-29 41 140. This top layer can also comprise a low molecular weight thermoplastic resin and silicone oils. Such packaging materials have the disadvantage that they are scratch-sensitive and also have unsatisfactory optical properties.

A transparent polyolefinic multilayer film which comprises a base layer of a propylene polymer and at least one sealable layer is known from EP-A-0 114 312. The sealable layer consists of an olefin resin composition of an ethylene/propylene/butylene polymer and a propylene/butylene polymer and comprises 5 to 15% by weight of a compatible hydrocarbon resin, 5 to 15% by weight of propylene homopolymer and 0.3 to 1.5% by weight of polydiorganosiloxane. According to the description, the film has a low sealing start temperature and good running reliability on high-speed packaging machines. However, the film is not printable. Furthermore, because of the added hydrocarbon resin, resin deposits which have an adverse effect on the film appearance, i.e., streaking, occur on the longitudinal stretching rolls during film production. Reconstruction of Example 1 of EP-A-0 114 312 revealed that the film still has deficiencies in its friction properties and a poor appearance including high clouding and low gloss. Disturbances in flow over the film width moreover occur, leading to extreme reject levels.

Sealable, transparent, polyolefinic multilayer films which comprise a base layer of a propylene polymer, a sealable surface layer comprising a copolymer of propylene and ethylene or 1-butene units and/or a terpolymer of ethylene, propylene and 1-butene units, and a second top layer of propylene polymer are known from EP-A-0 184 094. The non-sealable second top layer is equipped with polydimethylsiloxane and with a platelet-like antiblocking agent.

When the film of EP-A-0 184 094 was produced, it was found that the film has a poor film appearance and streaks of clouding due to disturbances in flow. Massive deposits of resin moreover occurred on the longitudinal stretching rolls. After storage for 4 weeks, the film was only inadequately printable, and after 2 months was no longer printable at all due to a surface tension <35 mN/m.

The company Mitsui Petrochemical Industries Ltd. describes, in their brochure TAFMER XR, Japan 82 03 1000 Cl, an α-olefin copolymer which is suitable as a sealing layer for polypropylene films. As Comparison Example 8 (Table 1) of the brochure shows, however, polypropylene films having sealing layers only of this product are not yet satisfactory in some respects.

It can be seen from the general state of the art that different properties and in particular specific combinations of individual quality features are required for the various uses of polypropylene films.

SUMMARY OF THE INVENTION

An object of the present invention is to avoid the disadvantages of the films described in the prior art. In particular, a polyolefin multilayer film which is sealable on both sides, and wherein one side has the lowest possible sealing start temperature, is provided. At the same time, good printability and good optical properties of the film are required, i.e., in particular a high surface gloss with minimum clouding and a homogeneous film appearance. Depending on its intended use, the film additionally has a low sensitivity to scratching and/or low friction and therefore good running properties on various types of high-speed packaging machines. Moreover, it is possible to produce the film without problems by conventional processes in which it is stretched biaxially with the aid of rolls and stenter frames.

It is also an object of the present invention to provide a process for making such a film and to provide various uses of such an improved film.

In accomplishing the foregoing objectives, there has been provided, in accordance with a first aspect of the present invention, a transparent, printable, biaxially orientated polyolefin multilayer film which can be sealed on both sides, comprising a base layer B and different top layers A and C located on both sides thereof corresponding to a layer build-up of ABC, wherein a) the base layer B comprises a peroxidically degraded polypropylene polymer having a degradation factor in the range from about 3 to about 10, and b) the top layer A comprises a polymer mixture of two or more of the following polymers:
   ethylene and propylene or
   ethylene and butylene or
   propylene and butylene or
   ethylene and another α-olefin having 5 to 10 carbon atoms or
   propylene and another α-olefin having 5 to 10 carbon atoms or
   a terpolymer of
   ethylene and propylene and butylene or
   ethylene and propylene and another α-olefin having 5 to 10 carbon atoms; and polydiorganosiloxane and silicon dioxide, and
c) the top layer C comprises a copolymer of
  ethylene and propylene or
  ethylene and butylene or
  propylene and butylene or
  ethylene and another α-olefin having 5 to 10 carbon atoms or
  propylene and another α-olefin having 5 to 10 carbon atoms or
  a terpolymer of
  ethylene and propylene and butylene or
  ethylene and propylene and another α-olefin having 5 to 10 carbon atoms,
  and on its outer surface has a non-cohesive covering of polydialkylsiloxane, and
d) the polydiorganosiloxane has a viscosity of greater than about 40,000 mm²/s.

In accordance with another aspect of the present invention, there has been provided a process for the production of this polyolefin multilayer film comprising the steps of:
  i) coextruding through a flat die the melts corresponding to the individual layers of the film,
  ii) taking off and cooling to consolidate the resulting film, via a take-off roll having a temperature between about 30° and about 50° C.,
  iii) biaxially stretching the consolidated film with a longitudinal stretching ratio of about 4:1 to about 7:1 and a transverse stretching ratio of about 8:1 to about 10:1,
  iv) thermofixing the biaxially stretched film,
  v) optionally subjecting top layer C to corona or flame treatment, and
  vi) covering top layer C with a non-cohesive layer of polydialkylsiloxane by bringing the two top layers A and C into contact.

In accordance with another aspect of the present invention there is provided packaging and laminates which comprise the above described film.

Further objects, features, and advantages of the present invention will become apparent from the detailed description of preferred embodiments which follows.

DETAILED DESCRIPTION OF PREFERRED EMBODIMENTS

The base layer of the polyolefin film of the present invention comprises a peroxidically degraded propylene polymer. Any such propylene polymer can be used. The polymer generally contains at least about 90% of propylene and generally has a melting point in the range from about 160° to about 170° C., preferably 162° to 168° C. Isotactic polypropylene having a content which is soluble in n-heptane of about 6% by weight or less, based on the isotactic polypropylene, copolymers of ethylene and propylene having an ethylene content of about 10% by weight or less, and copolymers of propylene with $C_4$-$C_8$-α-olefins having an α-olefin content of about 10% by weight or less are preferred propylene polymers. The melt flow index of the polypropylene polymer before the peroxidic degradation is generally less than about 1.5 g/10 minutes, preferably in the range from about 0.2 to about 0.9 g/10 minutes (measurement in accordance with DIN 53 735, 21.6N load and 230° C.).

In order to achieve the required good film appearance, the polypropylene polymer of layer B is partly degraded according to the invention. The degradation is generally accomplished by the addition of organic peroxides. This increases the melt flow index of the polypropylene polymer thus treated, generally to a range from about 2 to about 5.5 g/10 minutes. A measure of the degree of degradation of the polymer is the so-called degradation factor A, which indicates the relative change in melt flow index according to DIN 53 735 of the polypropylene, based on the starting polymer. Degradation factor A is represented by $$A = \frac{MFI_2}{MFI_1}$$

where
  $MFI_1$ = melt flow index of the polypropylene polymer before addition of the organic peroxide
  $MFI_2$ = melt flow index of the peroxidically degraded polypropylene polymer.

According to the invention, the degradation factor A of the polypropylene polymer employed is in a range from about 3 to about 10, preferably about 4 to about 8. If the degradation factor of the polypropylene homopolymer is less than about 3, the optical properties deteriorate, that is there is significant increase in clouding of the film, and lowering of the surface gloss. If the degradation factor is more than about 10, problems arise during production, for example the film can be stretched only in a very narrow temperature range, or can no longer be stretched at all.

Particularly preferred organic peroxides for the degradation are dialkyl peroxides, in which an alkyl radical is to be understood as meaning the customary saturated straight-chain or branched lower alkyl radicals generally having up to 6 carbon atoms. 2,5-Dimethyl-2,5-di(t-butylperoxy)hexane or di-t-butyl peroxide are particularly preferred.

If desired, the base layer of the peroxidically degraded propylene polymer can also comprise additives, such as, for example, antistatics and/or lubricants and/or stabilizers and/or neutralizing agents, in the particular effective amounts.

The top layer A of low sealing temperature located on the surface of the base layer comprises a polymer mixture of propylene copolymers and/or propylene terpolymers and optional additives in the particular effective amounts, the polymer mixture comprising two or more of the polymers mentioned below:
  A copolymer of
  ethylene and propylene or
  ethylene and butylene or
  propylene and butylene or
  ethylene and another α-olefin having 5 to 10 carbon atoms or
  propylene and another α-olefin having 5 to 10 carbon atoms or
  a terpolymer of
  ethylene and propylene and butylene or
  ethylene and propylene and another α-olefin having 5 to 10 carbon atoms.

It is to be understood that the polymers may contain monomers additional to those listed.

Particularly preferred polymer mixtures are those of two or more of the following polymers:
  A copolymer of
  ethylene and propylene or
  ethylene and 1-butylene or
  propylene and 1-butylene or
  a terpolymer of ethylene and propylene and 1-butylene,
in particular
random ethylene/propylene copolymers having an ethylene content of about 2 to about 10% by weight, preferably about 3 to about 6% by weight, or
random propylene/1-butylene copolymers having a butylene content of about 4 to about 25% by weight, preferably about 10 to about 20% by weight,
in each case based on the total weight of the copolymer, or
random ethylene/propylene/1-butylene terpolymers having an ethylene content of about 1 to about 10% by weight, preferably about 2 to about 6% by weight, and
a 1-butylene content of about 3 to about 20% by weight, preferably about 8 to about 10% by weight,
in each case based on the total weight of the terpolymer,
being particularly preferred.

In particular, a mixture of an ethylene/propylene/1-butylene terpolymer and a propylene/1-butylene copolymer having an ethylene content of about 0.1 to about 7% by weight and a propylene content of about 50 to about 90% by weight and a 1-butylene content of about 10 to about 40% by weight, based on the total weight of the polymer mixture, is especially advantageous.

The polymer mixture of top layer A generally has a melt flow index (DIN 53 735 at 230° C. under a 21.6N load) of about 1 to about 16 g/10 minutes, preferably of about 4 to about 10 g/10 minutes, the melt flow index of top layer A preferably being higher than that of the propylene polymer of the base layer.

The melting range of the polymer mixture of top layer A is generally about 120° C. or more, preferably between about 125° and about 142° C.

The polymer mixture generally has a content which is soluble in p-xylene of about 25 to about 70% by weight, preferably of about 40 to about 60% by weight, determined at 20° C.

Top layer A comprises, as an additive, a high-viscosity polydiorganosiloxane generally having a viscosity of greater than about 50,000 mm²/s, preferably between about 100,000 and about 1,000,000 mm²/s, at in each case 25° C., which is generally added in an amount of about 1.0 to about 4.0% by weight, preferably about 1.5 to about 3.0% by weight, based on top layer A.

Any such polydiorganosiloxane can be used. Examples of suitable polydiorganosiloxanes include polydialkylsiloxanes, olefin-modified siloxane oils, polyether-modified silicone oils, olefin/polyether-modified silicone oils, epoxy-modified silicone oils and alcohol-modified silicone oils. Polydialkylsiloxanes having 1 to 6 carbon atoms in the alkyl group, in particular polydimethylsiloxanes, are especially useful.

Top layer A additionally comprises silicon dioxide preferably having an average particle diameter of about 2 to about 6 μm as an antiblocking agent. This additive is present in an effective anti-blocking amount, and in particular from about 0.1 to about 1.0% by weight, preferably about 0.2 to about 0.5% by weight of SiO₂. If appropriate, the top layer A can comprise further additives which advantageously improve the properties of the film.

Top layer C of the multilayer film comprises one or more of the following polymers:
a copolymer of
ethylene and propylene or
ethylene and butylene or
propylene and butylene or
ethylene and another α-olefin having 5 to 10 carbon atoms or
propylene and another α-olefin having 5 to 10 carbon atoms or
a terpolymer of
ethylene and propylene and butylene or
ethylene and propylene and another α-olefin having 5 to 10 carbon atoms
and at least one, if appropriate, additive(s) in the particular effective amounts.

It is to be understood that these polymers can include other types of monomers.

The layer particularly preferably comprises copolymers of
ethylene and propylene or
ethylene and 1-butylene or
propylene and 1-butylene or
terpolymers of
ethylene and propylene and 1-butylene,
in particular
random ethylene/propylene copolymers having an ethylene content of about 2 to about 8% by weight, preferably about 3 to about 6% by weight, or
random propylene/1-butylene copolymers having a butylene content of about 4 to about 25% by weight, preferably about 10 to about 20% by weight,
in each case based on the total weight of the copolymer, or
random ethylene/propylene/1-butylene terpolymers having
an ethylene content of about 1 to about 10% by weight, preferably about 2 to about 6% by weight, and
a 1-butylene content of about 3 to about 15% by weight, preferably about 8 to about 10% by weight,
based on the total weight of the terpolymer,
being preferred.

The melt flow index of the co- or terpolymer of top layer C is generally less than about 3.0 g/10 minutes, and is preferably in the range from about 0.5 g/10 minutes to about 2.0 g/10 minutes (DIN 53 735). The melting point of the polymer is generally in the range from about 120° to about 140° C.

In a preferred embodiment, the co- or terpolymer of top layer C is partly degraded by addition of organic peroxides. This degradation is analogous to the peroxidic degradation described previously for the propylene polymer of the base layer.

The degradation factor A is generally in a range from about 3 to about 15, preferably about 6 to about 10. This corresponds to an increase in the melt flow index of the polymer to a range from about 5.5 to about 15 g/10 minutes. It is particularly advantageous here if the melt flow index achieved in the co- or terpolymer is greater than that of the polypropylene of the base layer.

It is furthermore preferable to carry out corona treatment by a technique which is known per se on the surface of top layer C, the treatment intensities being within the usual limits, preferably in the range from about 36 to about 42 mN/m. The layer then has a surface tension of 36 to 42 mN/m directly after production, and this does not drop substantially even after a storage period of several months.

The top layer C preferably comprises as an additive, an antiblocking agent in an antiblocking effective amount, generally about 0.1 to about 1.0% by weight, preferably about 0.2 to about 0.5% by weight. The agent is preferably silicon dioxide, preferably having an average particle diameter of about 2 to about 6 μm. If appropriate, top layer C can comprise further additives.

The surface of top layer C is additionally covered with a non-cohesive layer of a polydialkylsiloxane which is not, however, incorporated into the top layer. A non-cohesive layer here is understood as meaning a uniform distribution of polydialkylsiloxane on the surface, so that the surface is not completely covered by siloxane. This covering of the surface of the top layer is measured with the aid of ESCA spectroscopy and is stated as a dimensionless relative covering resulting from the ratio of the silicon intensity measured to the carbon intensity. According to the invention, the relative covering of top layer C is generally less than about 20, and is preferably in the range from about 2 to about 12.

Such a covering of the surface is achieved in any desired manner such as by intensive contact, for example bringing the two top layers A and C into contact with one another, whereby the polydialkylsiloxane particles incorporated in top layer A being transferred to but not incorporated into the surface of top layer C. Such a small amount is transferred by this procedure, with respect to the siloxane content of layer A, that the siloxane concentration of layer A does not change measurably, but a partial but not complete covering of the surface of layer C is achieved.

This transfer of polydialkylsiloxane described above is carried out after the optional corona treatment of top layer C. This sequence, i.e., first corona treatment, then covering of the surface is essential to achieve the combination of the desired film properties. Surprisingly, a very good printability is achieved by this procedure, the good sealing properties are retained at the same time and an adverse effect on other important properties is avoided.

The thickness of the individual top layers of the polyolefin multilayer film according to the invention is generally greater than about 0.4 μm. Usually it is between about 0.6 and 3.0 μm, and preferably it is in the range from about 0.6 to about 1 μm, it being possible for the top layers to be of the same or different thicknesses.

The total thickness of the multilayer film can vary within wide limits and depends on the intended use. It is in general about 10 to about 60 μm, preferably about 20 to about 40 μm, the base layer generally making up about 50 to about 90% of the total film thickness.

To further improve certain properties of the film according to the invention, both the base layer and the top layers can comprise further additives in a particular effective amount. Any known additive in any desired effective amount can be used. Examples of additives include antistatics and/or antiblocking agents and/or lubricants and/or stabilizers and/or neutralizing agents and/or low molecular weight hydrocarbon resins which are compatible with the polymers of the base layer and of the top layer(s). Examples of preferred additives follow. All the amounts stated in percent by weight (% by weight) in the following description in each case relate to the layer or layers to which the additive can be added.

Preferred antistatics include alkali metal alkanesulfonates, polyether-modified, i.e., ethoxylated and/or propoxylated, polydiorganosiloxanes (polyalkylphenylsiloxanes and the like) and/or the essentially straight-chain and saturated aliphatic, tertiary amines with an aliphatic radical having 10 to 20 carbon atoms, which are substituted by α-hydroxy-($C_1$–$C_4$)-alkyl groups, N,N-bis-(2-hydroxyethyl)-alkylamines having 10 to 20 carbon atoms, preferably 12 to 18 carbon atoms, in the alkyl radical being particularly suitable. The effective amount of antistatic is generally in the range from about 0.05 to about 3% by weight.

Lubricants include higher aliphatic acid amides, higher aliphatic acid esters, waxes and metal soaps and polydimethylsiloxanes. The effective amount of lubricant is generally in the range from about 0.1 to about 3% by weight. Addition of higher aliphatic acid amides in the range from about 0.15 to about 0.25% by weight in the base layer and/or the top layers is particularly suitable. Erucic acid amide is a particularly suitable aliphatic acid amide.

The customary stabilizing compounds for ethylene polymers, propylene polymers and other α-olefin polymers can be employed as stabilizers. The amount thereof added is generally between about 0.05 and about 2% by weight. Phenolic stabilizers, alkali metal/alkaline earth metal stearates and/or alkali metal/alkaline earth metal carbonates are particularly suitable.

Phenolic stabilizers in an amount of about 0.1 to about 0.6% by weight, in particular about 0.15 to about 0.3% by weight, and having a molecular weight of more than about 500 g/mol are preferred. Pentaerythrityl tetrakis-3-(3,5-di-tert-butyl-4-hydroxyphenyl)-propionate or 1,3,5-trimethyl-2,4,6-tris(3,5-di-tert-butyl-4-hydroxybenzyl)benzene are particularly advantageous.

Neutralizing agents are preferably calcium stearate and/or calcium carbonate having an average particle size of not more than about 0.07 mm, an absolute particle size of less than about 5 μm and a specific surface area of at least about 40 mm$^2$/g.

Alkaline earth metal stearates and carbonates in an added amount of about 0.01 to about 0.05% by weight furthermore are preferred, in particular calcium stearate and/or calcium carbonate having an average particle size of less than about 0.1 μm, preferably about 0.03 to about 0.07 μm, and having an absolute particle size of less than about 5 μm and a specific surface area of at least about 40 m$^2$/g.

Suitable antiblocking agents include inorganic additives, such as silicon dioxide, calcium carbonate, magnesium silicate, aluminum silicate, calcium phosphate and the like, and/or incompatible organic polymers, such as polyamides, polyesters, polycarbonates and the like, benzoguanamine/formaldehyde polymers, silicon dioxide and calcium carbonate being preferred. The effective amount of antiblocking agent is generally in the range from about 0.1 to about 2% by weight, preferably about 0.1 to about 0.5% by weight. The average particle size is generally between about 1 and about 6 μm, in particular about 2 and about 5 μm, particles having a spherical shape, as described in EP-A-0 236 945 and DE-A-38 01 535, being particularly suitable. The antiblocking agents are preferably added to the top layers.

The low molecular weight resins recommended are naturally occurring or synthetic resin having a softening point of about 60° to about 180° C., preferably about 80° to about 150° C., determined in accordance with ASTM E-28. Of the numerous low molecular weight resins, the hydrocarbon resins are preferred, and in particular in the form of the petroleum resins, styrene resins, cyclopentadiene resins and terpene resins (these resins are described in Ullmanns Encyklopädie der technischen Chemie (Ullmann's Encyclopedia of Industrial Chemistry), 4th edition, volume 12, pages 525 to 555). The effective amount of low molecular weight resin is generally about 3 to about 15% by weight, preferably about 5 to about 10% by weight, based on the layer.

The invention furthermore relates to a process for the production of the multilayer film according to the invention. Any desired process can be used for the production of a multilayered film, with the coextrusion process, which is known per se, being preferred. In the context of this process, the film is produced by coextruding the melts corresponding to the individual layers of the film through a flat die, taking off the film thus obtained on one or more roll(s) for consolidation, subsequently stretching (orientating) the film biaxially, thermofixing the biaxially stretched film and, if appropriate, subjecting the film to corona or flame treatment on the surface layer C intended for corona treatment. Finally, after the corona or flame treatment, surface layer C is covered with polydialkylsiloxane. The biaxial stretching (orientation) can be carried out simultaneously or in succession, with successive biaxial stretching, in which the film is first stretched longitudinally (in the direction of the machine) and then transversely (perpendicular to the direction of the machine), being preferred.

As is customary in the coextrusion process, the polymer or the polymer mixture of the individual layers is first compressed and liquefied in an extruder, the additives to be added preferably being introduced as a masterbatch. The melts are then forced simultaneously through a flat die (slit die), and the multilayer film forced out is taken off on one or more take-off rolls, which are generally kept at about 30° to about 50° C. by cooling, during which it cools and is consolidated.

The film thus obtained is then stretched longitudinally and transversely to the extrusion direction, leading to orientation of the molecular chains. The film is preferably stretched about 4:1 to about 7:1 in the longitudinal direction and is preferably stretched about 8:1 to about 10:1 in the transverse direction. Longitudinal stretching is advantageously carried out with the aid of two high-speed rolls of different speed, corresponding to the required stretching ratio, and transverse stretching is generally carried out with the aid of a corresponding stenter frame. Biaxial stretching is carried out particularly favorably at a slightly elevated temperature of the film, the longitudinal stretching preferably at about 120° to about 140° C. and the transverse stretching preferably at about 160° to about 175° C.

The biaxial stretching of the film is followed by its thermofixing (heat treatment), during which the film is generally kept at a temperature of about 150° to about 160° C. for about 0.5 to 10 seconds. The film is then wound up with a winding device in the customary manner.

The covering of the top layer with polydialkylsiloxane may be carried out in any desired manner and is advantageously carried out directly during winding up of the film after its production, since in this case the two different outer layers automatically lie on top of one another. The pressure generated by the winding up guarantees the necessary intensity of the contact between the two surfaces on top of one another, so that the required covering is already present after a short time, generally a few minutes.

As mentioned above, top layer C of the film is preferably subjected to corona or flame treatment by one of the known methods after the biaxial stretching. It is essential that this process step takes place before covering of surface C, i.e., before transfer of the siloxane by contact, for example, by winding up the film. For the corona treatment, a procedure is advantageously followed in which the film is passed between two conductor elements serving as electrodes, such that a high voltage, usually an alternating voltage of about 10,000 V and 10,000 Hz, is applied between the electrodes so that spray discharge or corona discharge can take place. The air above the film surface is ionized by the spray or corona discharge and reacts with the molecules of the film surface, so that polar incorporations are formed in the essentially non-polar polymer matrix. The treatment intensities are within the usual limits, preferably between about 36 and about 42 mN/m.

The additives for the layers, such as, for example, the high-viscosity polydialkylsiloxane, are generally added in the form of a masterbatch during film production. The term masterbatch is to be understood as meaning a mixture of the plastics raw material and a large amount of additive. This mixture is preferably added to and mixed with the polymeric raw material in the extruder, the amount added being matched to the desired concentration of additive. The masterbatch employed in the process according to the invention generally comprises between about 6 and about 18% by weight (based on the total weight of the masterbatch mixture) of additives.

The multilayer film according to the invention is distinguished in particular by outstanding sealing properties in combination with a low clouding of the film, a high surface gloss and a homogeneous film appearance. In respect of the sealing properties in particular, the film exhibits the desired low sealing start temperature on one side, while the other side seals in the customary temperature range, an outstanding weld seam strength overall being retained.

A weld seam strength of greater than about 1.4 at 125° C. and greater than about 2.5N/15 mm at 110° C. was thus found by the T peel method when determining the properties of various embodiments. The clouding value measured in accordance with ASTM D 1003 is always below 17%, and the gloss, measured in accordance with ASTM D 2457, is greater than 115 at a measurement angle of, for example, 20°.

Surprisingly, the multilayer films according to the invention exhibit, in addition to their desired weld seam strength, an outstanding printability, which, in particular, is unusually stable in the long term. The good weld seam strength also is not impaired, surprisingly, by the corona treatment.

Furthermore, completely unexpectedly, an increased scratch resistance of the top layers with simultaneously good friction properties are achieved, which means that the film is also outstandingly suitable for use on high-speed packaging machines.

Measurements (of the surface tension) moreover showed that the film according to the invention has a high surface tension, which unexpectedly drops only insignificantly even after a storage period of several months.

Summarizing, it may be said that the multilayer film according to the invention is distinguished by a large number of advantageous properties, in particular by
 a very high gloss,
 a low clouding,
 a low sealing start temperature on one side,
 good friction properties,
 a very good scratch resistance,
 a good short-term and long-term printability,
 a high surface tension,
 a good long-term stability of the surface tension and
 an outstanding weld seam strength, which is not impaired even by the corona treatment.

As a result of this surprising large number of excellent properties, a film is provided, according to the invention, which is outstandingly suitable for various intended uses, in particular as a packaging film on high-speed packaging machines.

The film moreover is excellently suitable as a carrier film for production of laminates with one or more of paper, card, metals, metallized films of plastic, and films of plastic.

The invention will now be explained in more detail with the aid of the following non-limiting examples.

EXAMPLE 1

A three-layer film 1 mm thick in total and having a layer build-up of ABC, i.e., the base layer B is surrounded by two different top layers AC, is extruded from a slit die at an extrusion temperature of 260° C. by the coextrusion process.

The base layer B essentially comprises a peroxidically degraded, isotactic polypropylene homopolymer having a content which is soluble in n-heptane of 4.5% by weight and a melting point of 165° C. The melt flow index of the polypropylene homopolymer before the addition of peroxides is $MFI_1 = 0.7$ g/10 minutes at 230° C. under a 21.6N load (DIN 53 735), and is then degraded to a melt flow index of $MFI_2 = 3.5$ g/10 minutes by addition of di-t-butyl peroxide, resulting in a degradation factor of 5.

The base layer is surrounded by the different sealing layers (outer layers, top layers), i.e. the three-layer film has an ABC build-up (A and C=sealing layers, B=base layer).

All the layers comprise 0.12% by weight of pentaerythrityltetrakis-4-(3,5-di-tert-butyl-4-hydroxyphenyl)propionate (®Irganox 1010) for stabilization and 0.06% by weight of calcium stearate for neutralization of acid catalyst residues. The base layer furthermore comprises 0.15% by weight of N,N'-bis-(2-hydroxyethyl)-($C_{10}$–$C_{20}$)alkylamine (®Armostat 300) as an antistatic.

Top layer A comprises essentially, i.e., to the extent of 97.4% by weight, a polymer mixture of
$a_1$) 50% by weight of an ethylene/propylene/butylene terpolymer comprising 1.4% by weight of ethylene, 2.8% by weight of butylene and 95.8% by weight of propylene (in each case based on the terpolymer) and
$a_2$) 50% by weight of a propylene/butylene copolymer comprising 66.8% by weight of propylene and 33.2% by weight of butylene (in each case based on the copolymer) ($a_1 + a_2$ = TAFMER XR-107 L), which corresponds to a content in $a_1$) + $a_2$) of 0.7% by weight of ethylene, 81.3% by weight of propylene and 18% by weight of butylene, based on the TAFMER XR-107 L. This polymer mixture $a_1 + a_2$ had a melt flow index of 8 g/10 minutes and a melting point of 150° C.

Top layer A additionally comprises
b) 0.2% by weight, based on the top layer, of silicon dioxide having an average particle diameter of 4.0 μm and
c) 2.4% by weight, based on the top layer, of polydimethylsiloxane having a kinematic viscosity of 500 000 mm$^2$/s at 25° C.

The high-viscosity polydimethylsiloxane is added to the abovementioned polymer mixture (TAFMER XR-107 L) via a masterbatch before the extrusion. The masterbatch comprises 12% by weight of the high-viscosity polydimethylsiloxane and 88% by weight of the polymer mixture (TAFMER XR-107 L).

Top layer C essentially comprises a propylene/ethylene copolymer with 5% by weight of ethylene and 0.3% by weight, based on the top layer, of added silicon dioxide having an average particle diameter of 2 to 4 μm.

The random ethylene/propylene copolymer of top layer C is degraded from a starting melt flow index $MFI_1$ of 0.7 g/10 minutes (DIN 53 735 under a 21.6N load at 230° C.) to a granule melt flow index $MFI_2$ of 5.6 g/10 minutes (DIN 53 735 under a 21.6N load at 230° C.) by addition of di-t-butyl peroxide, resulting in a degradation factor A of 8.

After the extension, the three-layer film is quenched on a chill roll warmed to 30° C. The film is then transferred from the chill roll to a trio of rolls also at 30 ° C. and, after heating to 130° C., is stretched longitudinally by a factor of 5 by a further trio of rolls. It is then stretched 10-fold in the transverse direction at an air temperature of 175° C. Corona treatment is subsequently carried out on top layer C at an alternating voltage of about 10 000 V and 10 000 Hz. The film thus produced has a surface tension of 39 to 40 mN/m on the treated side (top layer C) directly after production. It is then wound up with a winding device, the polydimethylsiloxane covering of top layer C described above taking place at the same time.

The multilayer film thus formed has an approximately 19 μm thick base layer of peroxidically degraded polypropylene and a top layer of thickness 0.8 to 0.9 μm on each side.

EXAMPLE 2

Example 1 is repeated.

However, the isotactic propylene homopolymer of the base layer was degraded from a polypropylene starting powder having a melt flow index $MFI_1$ of 0.5 g/10 minutes (determined in accordance with DIN 53 735 under a 21.6N load at 230° C.) to a granule melt flow index $MFI_2$ of 3.5 g/10 minutes (DIN 53 735 under a 21.6N load at 230° C.) by addition of di-t-butyl peroxide, resulting in a degradation factor A of 7.

EXAMPLE 3

Example 1 is repeated.

However, top layer A, which is not corona-treated, comprises 98.6% by weight of the polymer mixture described in Example 1 (TAFMER XR-107 L), 0.2% by weight, based on the top layer, of silicon dioxide having an average particle diameter of 4.0 μm and 1.2% by weight, based on the top layer, of polydimethylsiloxane having a kinematic viscosity of 500 000 mm$^2$/s at 25° C.

EXAMPLE 4

Example 3 is repeated.

However, the high-viscosity polydimethylsiloxane is added via a masterbatch which comprises 8% by weight of polysiloxane having a kinematic viscosity of 500 000 mm$^2$/s at 25° C. and 92% by weight of the polymer mixture mentioned (TAFMER XR-107 L).

EXAMPLE 5

Example 1 is repeated.

However, the polydimethylsiloxane added to top layer A, which is not corona-treated, has a kinematic viscosity of 300 000 m$^2$/s at 25° C.

EXAMPLE 6

Example 1 is repeated.

However, top layer C comprises an ethylene-/propylene/1-butene terpolymer having an ethylene content of 1.5% by weight and a 1-butene content of 7% by weight and 0.3% by weight of silicon dioxide having an average particle diameter of 4 μm, based on the top layer. The terpolymer is not degraded peroxidically and has a melt flow index of 4.5 g/10 minutes (DIN 53 735 under a 21.6N load at 230° C.).

EXAMPLE 7

Example 6 is repeated.

However, the terpolymer of top layer C is degraded from a starting melt flow index MFI$_1$ of 0.9 g/10 minutes to a granule melt flow index MFI$_2$ of 6.3 g/10 minutes by addition of di-t-butyl peroxide, resulting in a degradation factor of 7.

COMPARISON EXAMPLE 1

Example 1 is repeated.

The isotactic propylene homopolymer also has a granule melt flow index MFI$_2$ of 3.5 g/10 minutes (DIN 53 735 under a 21.6N load at 230° C.). However, the polypropylene polymer of the base layer is not peroxidically degraded.

COMPARISON EXAMPLE 2

Example 1 is repeated.

However, the polydimethylsiloxane which is added to top layer A as a lubricant has a kinematic viscosity of 30 000 mm$^2$/s at 25° C.

COMPARISON EXAMPLE 3

Example 1 is repeated.

However, the three-layer film formed has top layers which are 0.3 μm thick.

COMPARISON EXAMPLE 4

A three-layer film is produced in accordance with Example 1 of EP-A-0 114 312. Top layers A and C are built up in the same manner and essentially comprise a) 79% by weight, based on the top layer, of a polymer mixture composed of a$_1$) 50% by weight of an ethylene/propylene/butylene terpolymer comprising 1.4% by weight of ethylene, 2.8% by weight of butylene and 95.8% by weight of propylene (in each case based on the terpolymer) and a$_2$) 50% by weight of a propylene/butylene copolymer comprising 66.8% by weight of propylene and 33.2% by weight of butylene (in each case based on the copolymer), which corresponds to a content of 0.7% by weight of ethylene, 81.3% by weight of propylene and 18% by weight of butylene, based on the polymer mixture (this mixture a$_1$+a$_2$ has a melt flow index of 8 g/10 minutes and a melting point of 150° C.), and b) 10% by weight, based on the top layer, of a hydrogenated hydrocarbon resin having a softening point of 125° C.

The top layers additionally comprise c) 10% by weight, based on the top layer, of a propylene homopolymer having a melting point of 126° C. and d) 1% by weight, based on the top layer, of polydimethylsiloxane having a kinematic viscosity of 30 000 mm$^2$/s at 25° C.

COMPARISON EXAMPLE 5

Example 1 is repeated, but the top layers both comprise a random ethylene/propylene copolymer with 4.5% by weight of ethylene and without further additives (comparison with DE-A-16 94 694, which is hereby incorporated by reference).

COMPARISON EXAMPLE 6

Example 1 is repeated, but the raw material according to Example 2 of EP-B-0 027 586, which is hereby incorporated by reference, is employed for the top layers.

COMPARISON EXAMPLE 7

A three-layer film is produced in accordance with EP-B-0 184 094, which is hereby incorporated by reference.

Characterization of the Raw Materials

The following measurement methods are used for characterization of the raw materials and films:

Softening point: ASTM E 28

Melting point: DSC measurement, melting curve maximum, heating-up rate 20° C./minute.

Determination of the Low Pressure Weld Seam Strength

Two strips of film 15 mm wide are placed on top of one another and sealed at 110° C. over a sealing time of 0.5 second under a sealing pressure of 1.5N/cm$^2$ (apparatus: Brugger, type NDS, sealing bars heated on one side). The sealed seam strength is determined by the T peel method.

Determination of the Sealing Start Temperature

Heat-sealed samples (weld seam 20 mm×100 mm) are produced with an HSG/ET sealing unit from Brugger by sealing a film at different temperatures with the aid of two heated sealing bars under a sealing pressure of 15N/cm$^2$ over a sealing time of 0.5 second. Test strips 15 mm wide are cut out of the sealed samples. The T sealed seam strength, i.e., the force necessary for separation of the test strips, is determined using a tensile tester at a take-off speed of 200 mm/minute, the plane of the sealed seam forming a right angle with the pulling direction.

The sealing start temperature (or minimum sealing temperature) is the temperature at which a sealed seam strength of 0.5N/15 mm is achieved.

Ease of Passage through Machinery

The ease of passage through machinery (running reliability) on a vertical shaping-fill-closing machine (vSFc), a horizontal shaping-fill-closing machine (hSFc) and a wrapping machine was determined visually and was evaluated as follows:

| | | |
|---|---|---|
| very good | (++) | <2% of the sample packs are wrapped defectively |
| good | (+) | 2 to 6% of the sample packs are wrapped defectively |
| moderate | (+−) | 6 to 12% of the sample packs are wrapped defectively |
| poor | (−) | 12% or more of the sample packs are wrapped defectively |

Determination of the Corona Treatment Intensity

The corona treatment was carried out such that the treated film surface in each case had a treatment intensity of 39 to 41 mN/m directly after the treatment. The treatment intensity is determined by the so-called ink method (DIN 53 364).

Determination of Printability

The corona-treated films were printed 14 days after their production (short-term evaluation) and 6 months after their production (long-term evaluation). The ink adhesion was evaluated by means of the adhesive tape test. If no ink could be detached by means of adhesive tape, the ink adhesion was evaluated as good, and if there was significant detachment of ink, it was evaluated as poor.

Melt flow index: DIN 53 735 at 230° C. under a 21.6N load

Clouding

The clouding of the film is measured in accordance with ASTM-D 1003-52, a 1° slit diaphragm being employed instead of a 4° pin diaphragm and the clouding being stated in percent for four layers of film on top of one another. Four layers were chosen, since the optimum measurement range is thereby utilized. The clouding was evaluated as:

$<17\%$ = very good (++)
$\geq 17\%$ to 20% = good (+)
$\geq 20\%$ to 25% = moderate (±)
$\geq 25\%$ = poor (−)

Gloss

The gloss is determined in accordance with DIN 67 530. The reflector value is measured as the optical parameter for the surface of a film. The angle of incidence was set at 20° in accordance with the standards ASTM-D 523-78 and ISO 2813. A ray of light meets the flat test surface under the angle of incidence set, and is reflected or scattered by this surface. The light rays falling on the photoelectronic receiver are displayed as the proportional electrical parameter. The measurement value is dimensionless and must be stated with the angle of incidence. The gloss (angle of incidence 20°) is evaluated as:

$>115$ = very good (++)
$\leq 115$ to 110 = good (+)
$\leq 110$ to 100 = moderate (±)
$<100$ = poor (−)

Scratch Resistance or Sensitivity to Scratching

The scratch resistance is determined in accordance with DIN 53 754.

The Taber model 503 Abraser abrasion meter from Teledyne Taber is used to determine the scratch resistance, abrasive disks of the brand Calibrade R H18 loaded with 250 g being employed. Scratch resistance or sensitivity to scratching is understood as meaning the increase in clouding of the scratched film in comparison with the original film after 50 revolutions of the sample plate. The scratch resistance is described as very good (++) if the increase in clouding is less than 22%, good (+) if the increase in clouding is 22 to 25%, moderate (±) if the increase in clouding is 25 to 30% and poor (−) at clouding increases of greater than 30%.

The properties of the three-layer polyolefin films of the examples and comparison examples are summarized in the following table.

The superiority of the films according to the invention corresponding to Examples 1 to 7 can be clearly seen from the table. Although Comparison Examples 1 to 7 show comparable properties in individual points, none of the multilayer films according to Comparison Examples 1 to 7 can meet all the requirements at the same time. Only the films according to the invention have a low sealing start temperature on one side coupled with a high sealed seam strength on both sides and additionally guarantee low clouding of the film, a high surface gloss and a homogeneous film appearance, and the good scratch resistance and the good printability, which is stable in the long term, and the good running reliability of the film (ease of passage through machinery) on various types of high-speed packaging machines (vSFc, hSFc and wrapping machines) are additionally to be singled out. Only the polyolefinic multilayer films according to the invention from Examples 1 to 7 meet all these requirements at the same time.

| | Clouding 4-layered [%] | Gloss (Measurement angle 20°) | | Film appearance (visual evaluation) | Scratch resistance [%] | | Sealing start temperature (10 N/cm, 0.5 sec) [°C.] | |
|---|---|---|---|---|---|---|---|---|
| | | 1st side | 2nd side | | 1st side | 2nd side | 1st side | 2nd side |
| Examples | | | | | | | | |
| E1 | ++ | ++ | ++ | homogenous | ++ | ++ | 88 | 122 |
| E2 | ++ | ++ | ++ | homogenous | ++ | ++ | 88 | 122 |
| E3 | ++ | ++ | ++ | homogenous | ++ | ++ | 88 | 122 |
| E4 | ++ | ++ | ++ | homogenous | ++ | ++ | 88 | 122 |
| E5 | ++ | ++ | ++ | homogenous | ++ | ++ | 88 | 122 |
| E6 | ++ | ++ | ++ | homogenous | ++ | ++ | 88 | 120 |
| E7 | ++ | ++ | ++ | homogenous | ++ | ++ | 88 | 120 |
| Comparison Examples | | | | | | | | |
| CE1 | +/− | +/− | +/− | homogenous | ++ | ++ | 89 | 122 |
| CE2 | +/+ | +/+ | +/+ | flow disturbances | ++ | ++ | 88 | 122 |
| CE3 | +/+ | +/+ | +/+ | homogenous | +− | +− | 100 | 128 |
| CE4 | − | − | − | fow disturbance | +/− | +/− | 94 | >130 |
| CE5 | +/− | +/− | +/− | homogenous | − | − | 122 | 122 |

-continued

| | | | | | | | | |
|---|---|---|---|---|---|---|---|---|
| CE6 | – | – | – | flow disturbance | +/– | +/– | 120 | >130 |
| CE7 | +/– | +/– | +/– | flow disturbance | – | – | 88 | >130 |

| | Sealed seam strength | | | Ease of passage through machinery (visual evaluation) | | |
|---|---|---|---|---|---|---|
| | 110° C., 1.5 N/cm 0.5 s) N/15 mm 1st/1st side | (125° C., 1.5 N/cm 0.5 s) [N/15 mm] 2nd/1st side | Printability | vSFc machine | hSFc machine | wrapping machine |
| Examples | | | | | | |
| E1 | 2.6 | 1.5 | ++ | ++ | ++ | ++ |
| E2 | 2.6 | 1.5 | ++ | ++ | ++ | ++ |
| E3 | 2.7 | 1.6 | ++ | ++ | ++ | ++ |
| E4 | 2.7 | 1.6 | ++ | ++ | ++ | ++ |
| E5 | 2.6 | 1.4 | ++ | ++ | ++ | ++ |
| E6 | 2.7 | 1.6 | ++ | ++ | ++ | ++ |
| E7 | 2.6 | 1.6 | ++ | ++ | ++ | ++ |
| Comparison Examples | | | | | | |
| CE1 | 2.5 | 1.5 | ++ | + | + | + |
| CE2 | 2.6 | 1.5 | ++ | + | + | + |
| CE3 | 1.0 | 0.4 | +/– | +/– | +/– | +/– |
| CE4 | 1.8 | 0 | – | +/– | +/– | +/– |
| CE5 | 0 | 0.5 | ++ | – | – | – |
| CE6 | 0 | 0 | – | +/– | +/– | +/– |
| CE7 | 2.6 | 0 | – | +/– | +/– | +/– |

E: Example
CE: Comparison Example
vSFc: Vertical shaping-fill-closing
hSFc: Horizontal shaping-fill-closing

What is claimed is:

1. A transparent, printable, biaxially orientated polyolefin multilayer film which can be sealed on both sides, comprising a base layer B and different top layers A and C located on both sides thereof corresponding to a layer build-up of ABC, wherein
   a) the base layer B comprises a peroxidically degraded polypropylene polymer having a degradation factor in the range from about 3 to about 10, and
   b) the top layer A comprises a polymer mixture of two or more of the following polymers:
   a copolymer of
      ethylene and propylene or
      ethylene and butylene or
      propylene and butylene or
      ethylene and another α-olefin having 5 to 10 carbon atoms or
      propylene and another α-olefin having 5 to 10 carbon atoms or
   a terpolymer of
      ethylene and propylene and butylene or
      ethylene and propylene and another α-olefin having 5 to 10 carbon atoms; and
   a polydiorganosiloxane and silicon dioxide, and
   c) the top layer C comprises a copolymer of
      ethylene and propylene or
      ethylene and butylene or
      propylene and butylene or
      ethylene and another α-olefin having 5 to 10 carbon atoms or
      propylene and another α-olefin having 5 to 10 carbon atoms or
   a terpolymer of
      ethylene and propylene and butylene or
      ethylene and propylene and another α-olefin having 5 to 10 carbon atoms,
   and a non-cohesive covering of polydialkylsiloxane on its outer surface, and
   d) the polydiorganosiloxane has a viscosity of greater than about 40,000 mm²/s.

2. A polyolefin multilayer film as claimed in claim 1, wherein the silicon dioxide has an average particle diameter of about 2 to about 6 μm.

3. A polyolefin multilayer film as claimed in claim 2, wherein top-layer A comprises about 1 to about 4% by weight of the polydiorganosiloxane and about 0.1 to about 1.0% by weight of the silicon dioxide.

4. A polyolefin multilayer film as claimed in claim 1, wherein the polymer mixture of top layer A comprises two or more of the following polymers:
   random ethylene/propylene copolymers having an ethylene content of about 2 to about 10% by weight,
   random propylene/1-butylene copolymers having a butylene content of about 4 to about 25% by weight,
   in each case based on the total weight of the copolymer, and
   random ethylene/propylene/1-butylene terpolymers having
      an ethylene content of about 1 to about 10% by weight, and
      a 1-butylene content of about 3 to about 20% by weight,
      in each case based on the total weight of the terpolymer.

5. A polyolefin multilayer film as claimed in claim 1, wherein the polymer mixture of top layer A comprises a mixture of an ethylene/propylene/1-butylene terpolymer and a propylene/1-butylene copolymer
   having an ethylene content of about 0.1 to about 7% by weight
   and a propylene content of about 50 to about 90% by weight
   and a 1-butylene content of about 10 to about 40% by weight,
   based on the total weight of the polymer mixture.

6. A polyolefin multilayer film as claimed in claim 1, wherein the top layer C comprises silicon dioxide having an average particle diameter of about 2 to about 6

μm, and the relative covering of the surface with the polydialkylsiloxane is less than about 20.

7. A polyolefin multilayer film as claimed in claim 1, wherein the top layer C comprises one or more of
 a random ethylene/propylene copolymer having an ethylene content of about 2 to about 8% by weight, or
 a random propylene/1-butylene copolymer having a butylene content of about 4 to about 25% by weight,
 in each case based on the total weight of the copolymer, or
 a random ethylene/propylene/1-butylene terpolymer having
 an ethylene content of about 1 to about 10% by weight, and
 a 1-butylene content of about 3 to about 15% by weight,
 based on the total weight of the terpolymer.

8. A polyolefin multilayer film as claimed in claim 1, wherein the melt flow index of the polymer mixture of top layer A is between about 1 g/10 minutes and about 16 g/10 minutes.

9. A polyolefin multilayer film as claimed in claim 1, wherein the melt flow index of the propylene polymer of base layer B after peroxidic degradation is between about 2 g/10 minutes and about 5.5 g/10 minutes.

10. A polyolefin multilayer film as claimed in claim 1, wherein the melt flow index of the co- or terpolymer of top layer C is less than about 3.0 g/10 minutes.

11. A polyolefin multilayer film as claimed in claim 1, wherein the co- or terpolymer of top layer C is degraded peroxidically, the melt flow index after the degradation being between about 5.5 and about 15 g/10 minutes.

12. A polyolefin multilayer film as claimed in claim 1, wherein top-layer C has been corona-treated prior to application of the polydialkylsiloxane covering.

13. A polyolefin multilayer film as claimed in claim 1, wherein the thickness of the top layers A and C independently of one another are between about 0.6 and about 3.0 μm.

14. A polyolefin multilayer film as claimed in claim 1, wherein the total thickness of the multilayer film is between about 6 and about 70 μm.

15. A polyolefin multilayer film as claimed in claim 1, wherein the base layer and/or one or both of the top layers comprises one or more of antistatics, antiblocking agents, lubricants, stabilizers, neutralizing agents, and additional additives.

16. A packaging film comprising a polyolefin film as claimed in claim 1.

17. A polyolefin film as claimed in claim 1 which has been printed.

18. A laminate comprising a polyolefin film as claimed in claim 1.

19. A laminate as claimed in claim 18, comprising one or more of paper, cardboard, metals, metallized films of plastic and films of plastic in combination with the polyolefin film.

20. A polyolefin multilayer film as claimed in claim 1, wherein the peroxidically degraded polypropylene polymer contains at least 90% by weight of propylene.

21. A polyolefin multilayer film as claimed in claim 1, wherein the peroxidically degraded polypropylene polymer is an isotactic polypropylene having a content which is soluble in n-heptane of about 6% by weight or less.

22. A polyolefin multilayer film as claimed in claim 1, wherein the peroxidically degraded polypropylene polymer has a melting point in the range from about 160° to about 170° C.

23. A polyolefin multilayer film as claimed in claim 1, wherein the peroxidically degraded polypropylene polymer is a homopolymer of propylene.

* * * * *

UNITED STATES PATENT AND TRADEMARK OFFICE
CERTIFICATE OF CORRECTION

PATENT NO. : 5,436,041
DATED : July 25, 1995
INVENTOR(S) : Ursula MURSCHALL et al.

It is certified that error appears in the above-indentified patent and that said Letters Patent is hereby corrected as shown below:

Column 1, item:

[30], contains a typographical error wherein "43 05 555.5" should read --42 05 555.5--.

Signed and Sealed this

Second Day of December, 1997

Attest:

BRUCE LEHMAN

Attesting Officer    Commissioner of Patents and Trademarks